United States Patent
Stenton et al.

(10) Patent No.: US 8,087,197 B2
(45) Date of Patent: Jan. 3, 2012

(54) METHOD AND APPARATUS FOR INFLUENCING REFLECTIONS FROM AN OPTICAL SURFACE

(75) Inventors: William Conrad Stenton, Midland (CA); Stanislaw Szapiel, Port McNicoll (CA)

(73) Assignee: Raytheon Company, Waltham, MA (US)

( * ) Notice: Subject to any disclaimer, the term of this patent is extended or adjusted under 35 U.S.C. 154(b) by 830 days.

(21) Appl. No.: 11/966,013

(22) Filed: Dec. 28, 2007

(65) Prior Publication Data

US 2010/0281749 A1    Nov. 11, 2010

(51) Int. Cl.
*F41G 3/00* (2006.01)

(52) U.S. Cl. .......................................... 42/119; 359/819
(58) Field of Classification Search ................ 42/119; 359/819, 829

See application file for complete search history.

(56) References Cited

U.S. PATENT DOCUMENTS

| | | | | |
|---|---|---|---|---|
| 3,161,716 A | * | 12/1964 | Burris et al. | 356/247 |
| 4,105,282 A | * | 8/1978 | Schael | 359/364 |
| 6,327,806 B1 | * | 12/2001 | Paige | 42/113 |

* cited by examiner

*Primary Examiner* — Stephen M Johnson
(74) *Attorney, Agent, or Firm* — Haynes and Boone, LLP

(57) ABSTRACT

An optical system has an optical component with a curved surface and zero optical power. The optical system is configured so that the optical component is the first optical structure encountered by radiation entering the optical system from externally thereof. According to a different aspect, a method is provided for making an optical system that has an optical component with a surface, where the optical component is the first optical structure encountered by radiation entering the optical system from externally thereof. The method includes configuring the surface to be curved, and configuring the optical component to have zero optical power.

17 Claims, 2 Drawing Sheets

— METHOD AND APPARATUS FOR INFLUENCING REFLECTIONS FROM AN OPTICAL SURFACE

FIELD OF THE INVENTION

This invention relates in general to optical systems and, more particularly, to techniques for reducing or adjusting reflections from an optical surface of an optical system.

BACKGROUND

Over the years, various techniques have been developed to help a person accurately aim a weapon such as a rifle. One common approach is to mount a sight or scope on the weapon. A person then uses the sight or scope to view an image of a scene that includes an intended target.

In many weapon sights, the first optical surface encountered by radiation entering the sight is a flat surface. When a beam of radiation such as sunlight is traveling along a path and encounters this flat surface, some portion of that radiation is typically reflected, and all of the reflected radiation will then travel away from the surface in the same direction. In a hunting situation, this glint may startle an animal being hunted, such as a deer. In a combat situation, the glint may alert an enemy combatant to the presence of the soldier using the weapon.

Moreover, if a person holding the weapon sight pivots the weapon with the sight thereon, the reflected radiation will be swept through an angle twice that of the angle of weapon movement. This increases the size of a remote region where the glint from the reflection is likely to be noticed.

In an attempt to reduce reflections of this type, various arrangements have previously been utilized, such as antireflection coatings, shades and baffles. Although these known techniques have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
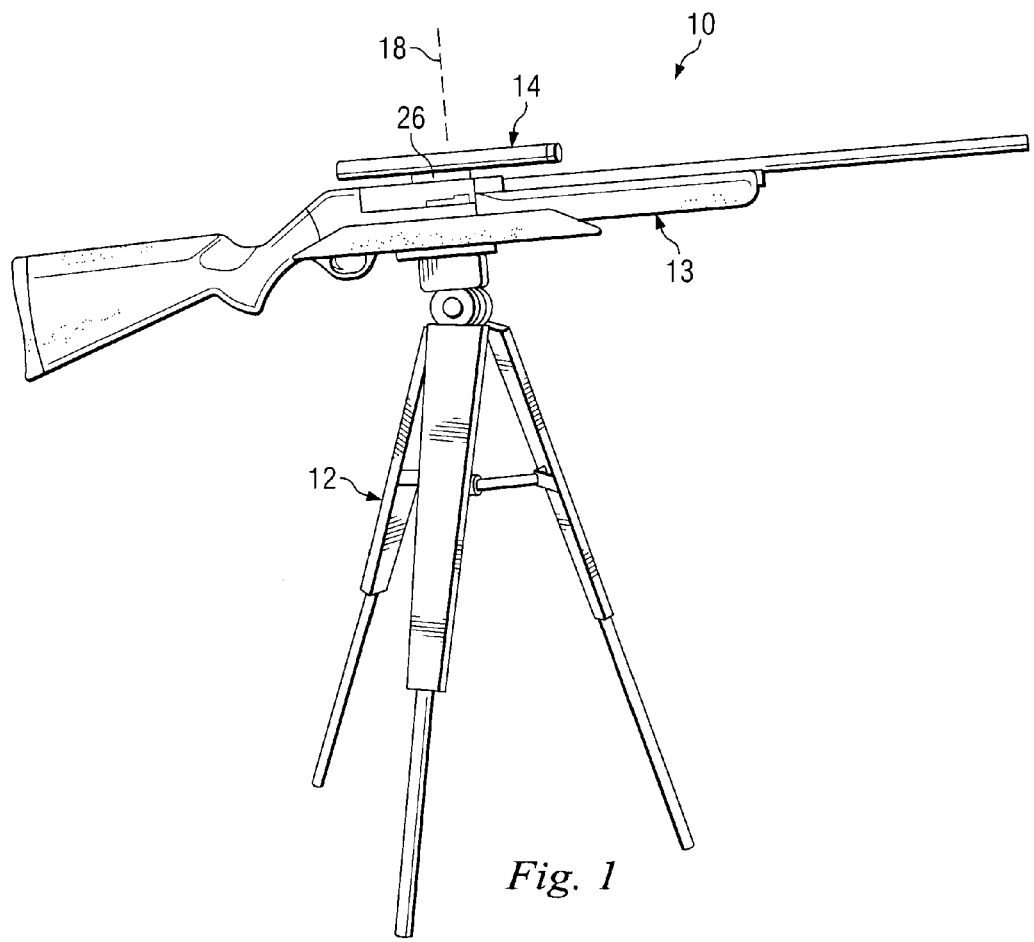
FIG. 1 a diagrammatic perspective view of an apparatus that embodies aspects of the invention, and that includes a tripod, a weapon, and a weapon sight.

FIG. 1 a diagrammatic perspective view of an apparatus 10 that embodies aspects of the invention, and that includes a tripod 12, a weapon 13, and a weapon sight 14. In the disclosed embodiment, the tripod 12 and the weapon 13 are devices of a type known in the art, and are therefore discussed here only briefly. More specifically, the illustrated weapon 13 is a firearm, and in particular a rifle, but it could alternatively be some other type of weapon. The rifle 13 is removably mounted on an upper portion of the tripod 12, and the upper portion of the tripod 12 with weapon 13 thereon can move relative to the lower portion of the tripod, including pivotal movement about an approximately vertical axis 18.

The weapon sight 14 is removably mounted on the rifle 13 by a mount 26. The mount 26 cooperates with the rifle 13 in a manner that is known in the art, and that is therefore not described here in detail.

Figure 2:
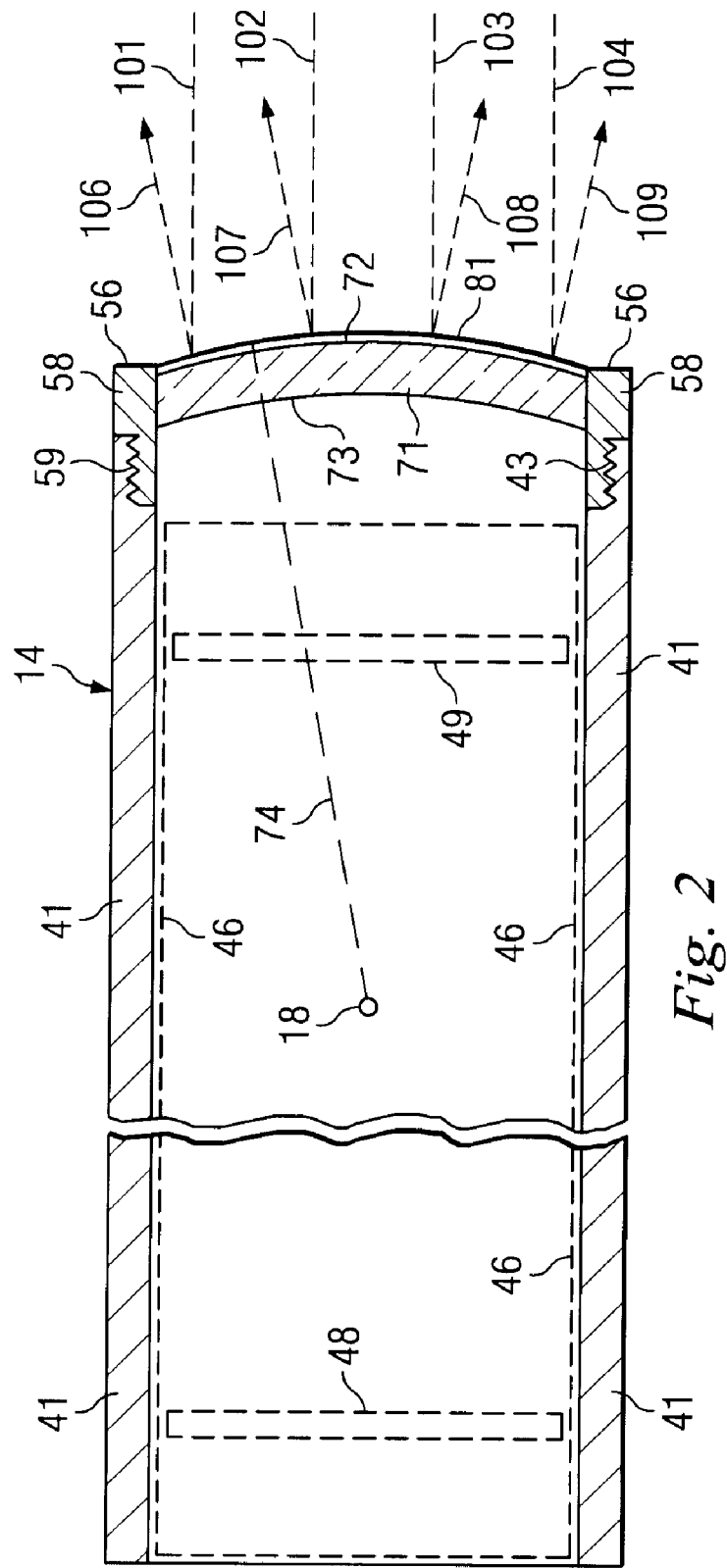
FIG. 2 is a diagrammatic sectional top view of the weapon sight of FIG. 1.

FIG. 2 is a diagrammatic sectional top view of the weapon sight 14. The sight 14 includes a tubular housing 41 that is open at both ends. For simplicity, the housing 41 is depicted in FIG. 2 with a cylindrical shape, but it could alternatively have any of a variety of other shapes. At the front end, the housing 41 has coupling structure in the form of internal threads 43. An optical system 46 is mounted within the housing 41, and is represented diagrammatically in FIG. 2 by broken lines. Optically, the system 46 functions as a weapon sight that can be used to aim the rifle 13 (FIG. 1). The optical system 46 is an arrangement of a known type, and is therefore not illustrated and described here in detail. The optical system 46 includes some optical components, such as lenses, prisms, mirrors, beam splitters and/or other optical components. Two of these optical components are represented diagrammatically in FIG. 2 by broken lines 48 and 49.

The sight 14 further includes an auxiliary part 56 that is detachably coupled to the front end of the housing 41. The auxiliary part 56 includes a housing 58 in the form of a cylindrical sleeve. The housing 58 has coupling structure at the rear end, in the form of external threads 59. The external threads 59 engage the internal threads 43 of the housing 41, in order to detachably secure the auxiliary part 56 to the housing 41.

The auxiliary part 56 includes a window 71 that is fixedly mounted within the housing 58, at the front end thereof. The window 71 is curved, but is configured so that it has no optical power with respect to radiation of interest that passes through it. The curved window 71 has an outer surface 72 that is curved, and an inner surface 73 that is also curved. In the disclosed embodiment, the outer and inner surfaces 72 and 73 are each approximately spherical, but each could alternatively be aspherical. In the disclosed embodiment, the spherical surface 72 has a radius 74, and a centerpoint that lies on or near the approximately vertical pivot axis 18 of the tripod 12 (FIG. 1). The surface 73 also has a centerpoint that lies on or near the approximately vertical pivot axis 18 of the tripod 12. The window 71 may optionally be made from a material that filters out certain wavelengths of radiation. For example, it may be a material that filters out wavelengths corresponding to laser energy, in order to help protect the eye of a user from being damaged by an incoming laser beam.

In the disclosed embodiment, a thin coating 81 is provided on the outer surface 72 of the window 71. In FIG. 2, the coating 81 is an antireflection (AR) coating of a type known in the art. Alternatively, the coating 81 could be a filter layer of a known type that includes a plurality of sub-layers and that filters out a selected waveband of radiation, such as laser energy. As still another alternative, the coating 81 could include an antireflection layer as well as layers that effect filtering. A similar coating could optionally be provided on the inner surface 73.

In operation, when rays 101-104 of radiation from the sun or some other source are traveling in approximately the same direction and impinge at various spaced locations on the outer surface 72 of the window 71, the curvature of surface 72 will cause any reflections 106-109 to be scattered, and to travel away from the surface 72 in respective different directions. Consequently, the amount of reflected energy that reaches a person or animal at a remote location is less than would be the case if the surface 72 was flat and directed all reflected radiation in the same direction toward the person or animal. Most of the incoming radiation at 101-104 will pass through the outer surface 72 and through the window 71, and some of it may be reflected by the curved inner surface 73. The considerations that apply to the outer surface 72 also apply to the inner surface 73. In particular, the curvature of the inner surface 73 will cause any reflections to be scattered, and to travel away from the surface 73 in respective different directions. Consequently, the amount of reflected energy that reaches a person or animal at a remote location is less than would be the case if the inner surface 73 was flat and directed all reflected radiation in the same direction toward the person or animal.

A further consideration is that, since the outer and inner surfaces 72 and 73 are each configured to have a centerpoint on or near the axis 18, if the rifle 13 (FIG. 1) and its weapon sight 14 are pivoted on the tripod about the axis 18, there will be minimal alteration in the reflection characteristic of the radiation 101-104 reflected by the outer surface, or the radiation reflected by the inner surface. Consequently, in contrast to traditional flat surfaces, any glint traveling from either curved surface 72 or 73 to an animal or person at a remote location will be less noticeable than in the case of reflections from a flat surface.

Figure 3:
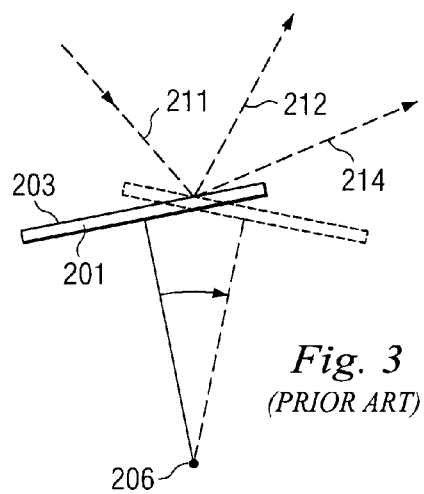
FIG. 3 is a diagram showing two positions of a conventional optical component with a flat outer surface.

For example, FIG. 3 is a diagram showing a conventional optical component 201 with a flat outer surface 203. When the component 201 is in the position shown in solid lines, a ray of radiation represented by an arrow 211 will be reflected, and will then travel away from the component in a manner represented by arrow 212. In contrast, if the component 201 is pivoted about a pivot point 206 from the position shown in solid lines to the position shown in broken lines, the same ray of radiation 211 would be reflected in a substantially different direction, as represented by the arrow 214. In fact, as the component is pivoted from the solid line position to the broken line position, the direction of the reflection will progressively sweep from the direction indicated at 212 to the direction indicated at 214. As the reflected radiation is sweeping through this angle, if it happens to sweep past a person at a remote location, the change in intensity of the radiation at that remote location will represent a highly noticeable glint that is very likely to attract the attention of the person.

Figure 4:
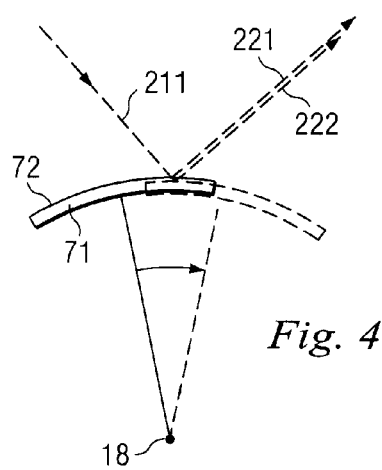
FIG. 4 is a diagram similar in some respects to FIG. 3, but showing two positions of a zero-power window that is a component of the weapon sight of FIG. 1.

FIG. 4 is a diagram similar to FIG. 3, but showing the zero-power window 71 of FIG. 2, which has the approximately spherical outer surface 72. When the window 71 is in the position shown in solid lines in FIG. 4, the ray of radiation represented by arrow 211 will be reflected, and will then travel away from the window 71 in a manner represented by arrow 221. If the window 71 is pivoted about the pivot axis 18 from the position shown in solid lines to the position shown in broken lines, the same ray of radiation 211 would be reflected in the same direction, or substantially the same direction, as represented diagrammatically by the arrow 222. The arrow 222 is substantially coincident with the arrow 221. Thus, as the window 71 is pivoted from the solid line position to the broken line position, the direction of reflection for radiation 211 will under go little or no change. Consequently, as the window 71 is moved, a person at a remote location would see little or no significant change in the intensity of reflected radiation. Consequently, the person would not be exposed to a noticeable glint that would be highly likely to attract the attention of that person.

The foregoing discussion is directed to an embodiment (FIG. 1) that pivots about a pivot axis 18 of a weapon support such as the tripod 12. Alternatively, however, in a situation where it is expected that the rifle 13 will be supported manually, rather than by the tripod 12, pivotal movement of the rifle 13 and the sight 14 could occur about a roughly vertical axis extending approximately through the head and torso of a person using the rifle, rather about than the pivot axis 18. In that case, the outer surface 72 could have a curvature with a centerpoint located in the region of the head or torso of the user, rather than on or near the pivot axis 18 of the tripod.

Although one selected embodiment has been illustrated and described in detail, it should be understood that a variety of substitutions and alterations are possible without departing from the spirit and scope of the present invention, as defined by the claims that follow.

What is claimed is:

1. An apparatus comprising
    an optical system having an optical component with a curved surface and zero optical power, said optical system being configured so that said optical component is the first optical structure encountered by radiation entering said optical system from externally thereof, the optical component having an optical centerpoint that lies along a line of sight through a first housing that supports an optical part with an optical power, the optical system including a second housing part that supports said optical component and that is detachably coupled to said first housing part.

2. An apparatus according to claim 1, wherein said curved surface is an outer surface of said optical component, and said curved outer surface is the first optical structure encountered by radiation entering said optical system from externally thereof.

3. An apparatus according to claim 1, wherein said optical component is an optical filter.

4. An apparatus according to claim 3, wherein said optical component filters laser energy out of radiation entering said optical system.

5. An apparatus according to claim 1, wherein said optical system includes optical structure that constitutes a weapon sight, that is disposed in said first housing part, and that includes said optical part.

6. An apparatus according to claim 1,
    wherein said curved surface is approximately spherical and has a centerpoint, and
    wherein said apparatus is subject to potential movement about an axis of rotation that extends through said centerpoint.

7. An apparatus according to claim 1, wherein said curved surface has an antireflection coating thereon.

8. An apparatus according to claim 1, wherein said first housing is a sleeve having said optical component mounted therein, and having coupling structure at one end thereof.

9. An apparatus according to claim 1 wherein said second housing is detachably coupled to said first housing via a threaded coupling structure.

10. A method of making an optical system that has an optical component with a surface thereon, the optical component being the first optical structure encountered by radiation entering said optical system from externally thereof said method comprising:
    configuring said surface to be curved;
    configuring said optical component to have zero optical power;
    configuring said optical system to include an optical part with an optical power;
    providing a first housing part that supports said optical part;
    providing a second housing part that supports said optical component;

configuring an optical centerpoint of the optical component to lie along a line of sight through the first housing; and detachably coupling said second housing part to said first housing part.

11. An apparatus according to claim 10, including configuring said optical component so that said curved surface is an outer surface thereof, said curved outer surface being the first optical structure encountered by radiation entering said optical system from externally thereof.

12. A method according to claim 10, including configuring said optical component to be an optical filter.

13. A method according to claim 10, including configuring of said optical component to be an optical filter that filters laser energy out of radiation entering said optical system.

14. A method according to claim 10, including configuring said optical system to include optical structure that constitutes a weapon sight, that is disposed in said first housing part, and that includes said optical part.

15. A method according to claim 10, including configuring said curved surface to he approximately spherical and to have a centerpoint positioned approximately at an axis about which said optical system can be pivoted.

16. A method according to claim 10, including forming an antireflection coating on said curved surface.

17. A method according to claim 10 wherein said step of detachably coupling includes detachably coupling said second housing to said first housing via a threaded coupling structure.

* * * * *